United States Patent [19]

Bronicki et al.

[11] 4,446,700

[45] May 8, 1984

[54] SOLAR POND POWER PLANT AND METHOD OF OPERATING THE SAME AS A PART OF AN ELECTRICAL GENERATING SYSTEM

[75] Inventors: Lucien Y. Bronicki, Rehovot; Haim Hershman, Givat Shmuel, both of Israel; Gerard Lehmann, Paris, France

[73] Assignee: Solmat Systems, Ltd., Yavne, Israel

[21] Appl. No.: 302,575

[22] Filed: Sep. 15, 1981

[51] Int. Cl.³ .............................................. F03G 7/02
[52] U.S. Cl. ..................................... 60/641.8; 60/652; 60/660; 290/4 C; 290/40 B; 290/40 C
[58] Field of Search .................. 60/641.8, 652, 660, 60/664; 290/4 C, 40 B, 40 C; 126/415

[56] References Cited

U.S. PATENT DOCUMENTS 4,063,419 12/1977 Garrett .......................... 126/415 X
4,370,860 2/1983 Assaf ............................. 60/641.8 X

OTHER PUBLICATIONS

*IEEE Spectrum*, "A Solar-Pond Power Plant", Bronicki, Yehuda L., Feb. 1981, vol. 18, No. 2, pp. 56–59.

*Primary Examiner*—Allen M. Ostrager
*Assistant Examiner*—Stephen F. Husar
*Attorney, Agent, or Firm*—Sandler & Greenblum

[57] ABSTRACT

A solar pond power plant has a solar pond with a heat storage layer for storing heat absorbed from solar radiation incident on the pond, and a low-temperature, closed Rankine-cycle turbogenerator operating on heat extracted from the heat storage layer. The turbogenerator has a generating capacity of $Q_I$ watts/m² of pond area, this capacity being in excess of $Q_e$ watts/m² of pond area where $Q_e$ is the net electrical energy that can be generated by the turbogenerator when heat is extracted from the heat storage layer at substantially the same average rate at which heat is absorbed by the layer. According to the invention, the generating capacity $Q_I$ of the turbogenerator is in the range 2–10 times $Q_e$, whereby the solar pond power plant can be utilized for peak power requirements of a regional electrical generating system.

20 Claims, 6 Drawing Figures

SOLAR POND POWER PLANT AND METHOD OF OPERATING THE SAME AS A PART OF AN ELECTRICAL GENERATING SYSTEM

TECHNICAL FIELD

This invention relates to a solar pond power plant and method of operating the same as a part of an electrical generating system.

BACKGROUND ART

A solar pond power plant comprises two major elements: a solar pond for collecting and storing solar radiation incident on the pond, and a power plant that utilizes a low-temperature turbogenerator for converting heat extracted from the pond into electricity.

One form of solar pond comprises an upper, convective wind-mixed layer exposed to solar radiation with a depth that varies from 10-50 cm, depending on weather conditions, and having salinity that varies from 3-5%; a non-convective intermediate halocline about 1-1.5 m deep whose salinity increases with depth to a maximum of about 25-30% for absorbing heat from solar radiation passing through the wind-mixed layer; and a lower heat storage layer about 3-5 m deep and of 25-30% uniform salinity. Solar radiation penetrating the wind-mixed layer and the halocline is absorbed in the heat storage layer. Radiation absorbed in the halocline establishes therein a temperature gradient that matches the salinity gradient, causing the halocline to act as an insulator for the heat storage layer and thereby preventing heat absorbed by the heat storage layer from being lost to the atmosphere by convection. The lowermost layer in the pond is a stratified thermocline which limits transfer of heat to the ground under the solar pond.

A suitable low-temperature turbogenerator for a solar pond power plant comprises a generator driven by a vapor turbine such as a low-pressure steam turbine, or an organic fluid turbine operating on a closed Rankine cycle. The power plant itself includes a boiler formed of a heat exchanger through which hot brine from the heat storage layer is pumped, the cooled brine being returned to the heat storage layer at a point isolated from the point at which the brine is drawn into the boiler. For an organic fluid turbine, the heat exchanger contains Freon or other similar fluid, which is vaporized by the hot brine in the heat exchanger, the vaporized working fluid being supplied to a turbine within which the vaporized working fluid expands for driving the generator. The working fluid exhausted from the turbine is then directed into a condenser where the working fluid is condensed and returned by a pump to the heat exchanger, thus completing the working fluid cycle.

In one arrangement, the condenser is cooled by water drawn from the wind-mixed layer, the warmed water produced by the condenser being returned to the surface of the pond where the heat absorbed in the condenser is dissipated into the atmosphere. Other arrangements for the condenser are also possible, of course, where cooling water other than the pond is available.

In southern California and at comparable latitudes, the solar input to a pond averages about 250 watts/m² of pond area (on a 24-hour, yearly basis). From past experience, the heat input to the heat storage layer is about 40 watts/m². Taking into account the various efficiencies of thermal to electrical conversion of an organic fluid Rankine-cycle turbogenerator, the net electrical output, in terms of heat, for producing energy at the same rate at which heat is absorbed in the heat storage layer is about 3 watts/m². Thus, a pond one square kilometer in size would furnish sufficient heat to produce about 26 million KWh of electricity per year.

Based on actual experience in constructing and operating a 7,500 m² solar pond power plant at EinBokek, Israel, pond construction costs are estimated to be about $12.00 per square meter, and equipment costs are estimated to be about $900.00 per installed kilowatt. For a 3 MW solar pond power plant using a one-square-kilometer pond, the total cost is estimated to be about $5,000.00 per installed kilowatt. This figure is about five times greater than the cost of an installed kilowatt in a conventional coal-fired plant, and about fifteen times greater than the cost of an installed kilowatt in a gas turbine plant. Even though cost economies in pond construction within the next five years should cut the installed kilowatt cost by 50%, investment in solar pond power plants is justifiable only on the basis of fuel savings.

By reason of the current high cost of fuel, the likelihood of even higher costs in future years, and the possibility of interruption in supply of this fuel, regional electric generating systems, which have installed capacity in the thousands of megawatts utilizing large-scale fossil and nuclear fueled power plants, as well as hydroelectric plants, are considering the integration of solar pond power plants into their systems. As is well known, regional electrical generating systems generally utilize their newest and most efficient plants (i.e., nuclear plants and hydroelectric plants, as well as coal plants) to supply the base power load of the system being served inasmuch as these plants operate for extended periods of time and have the lowest unit cost of production. Intermediate loads on the system, which are relatively large loads that are somewhat time-variable according to daily or seasonal demands, are conventionally furnished by older and less efficient plants that are brought on line as needed to supplement the output of the base load power plants. Peak power requirements in excess of the base and intermediate loads constitute a relatively small percentage of the total power output of a system, and operate for relatively short periods during a day. Consequently, peak power is conventionally supplied by relatively inefficient but highly reliable gas turbine power plants that can be brought on line or removed from service quickly in accordance with system load requirements.

Because the concept of solar pond power plants is so new, little experience is available on which to base decisions on integrating a solar pond power plant into a regional electrical generating system. Consequently, it is an object of the present invention to provide a new and improved solar pond power plant and method for operating the same as a part of an electrical generating system.

DISCLOSURE OF INVENTION

According to the present invention, the turbogenerator of a solar pond power plant of the type described has a generating capacity of $Q_I$ watts/m² of pond area, this capacity being in excess of $Q_e$ watts/m² of pond area, where $Q_e$ is the net electrical energy that can be generated by the turbogenerator when heat is extracted from the heat storage layer at substantially the same rate at which this layer absorbs heat, on the average.

$Q_I$ may be an order of magnitude greater than $Q_e$, and preferably is in the range 2-10 times $Q_e$. Thus, for a solar pond power plant located at the latitude of Southern California, where $Q_e$ is about 3 watts/m² of pond area, $Q_I$ may be 20 watts/m² of pond area. For a pond of area $10^6$ m² (i.e., 1000 m × 1000 m), $Q_I$ can be 20 MW instead of 3 MW. However, a 20 MW solar pond power plant can operate only about 3.5 hours per day if the heat storage capacity of the pond is to be maintained. Thus, a solar pond power plant according to the present invention is an ideal peak power source for an electrical utility supplying power to a large, time variable load.

The present invention is based on the recognition that a solar pond, in steady-state condition, contains the heat equivalent of 26.3 KWh of electrical power per square meter of pond area, and can be drawn out over a period of a year at any desired rate so long as the product of the daily generating capacity and the number of hours of operation, when summed over a year, totals no more than 26.3 KWh/m² of pond area. On an interim basis (i.e., hours or even days under emergency conditions), even more energy than this can be extracted from the pond by drawing on the large amount of heat stored in the pond at any time. Because a solar pond power plant can be brought on line quickly to supply short-duration peak power requirements of a utility or long-duration, relatively lower base-line requirements, and because of the advantage it has as to fuel costs, it is a viable alternative to conventional peak-power plants such as gas turbines and diesels.

BRIEF DESCRIPTION OF DRAWINGS

An embodiment of the invention is illustrated in the accompanying drawings, wherein.

DETAILED DESCRIPTION

Figure 1:
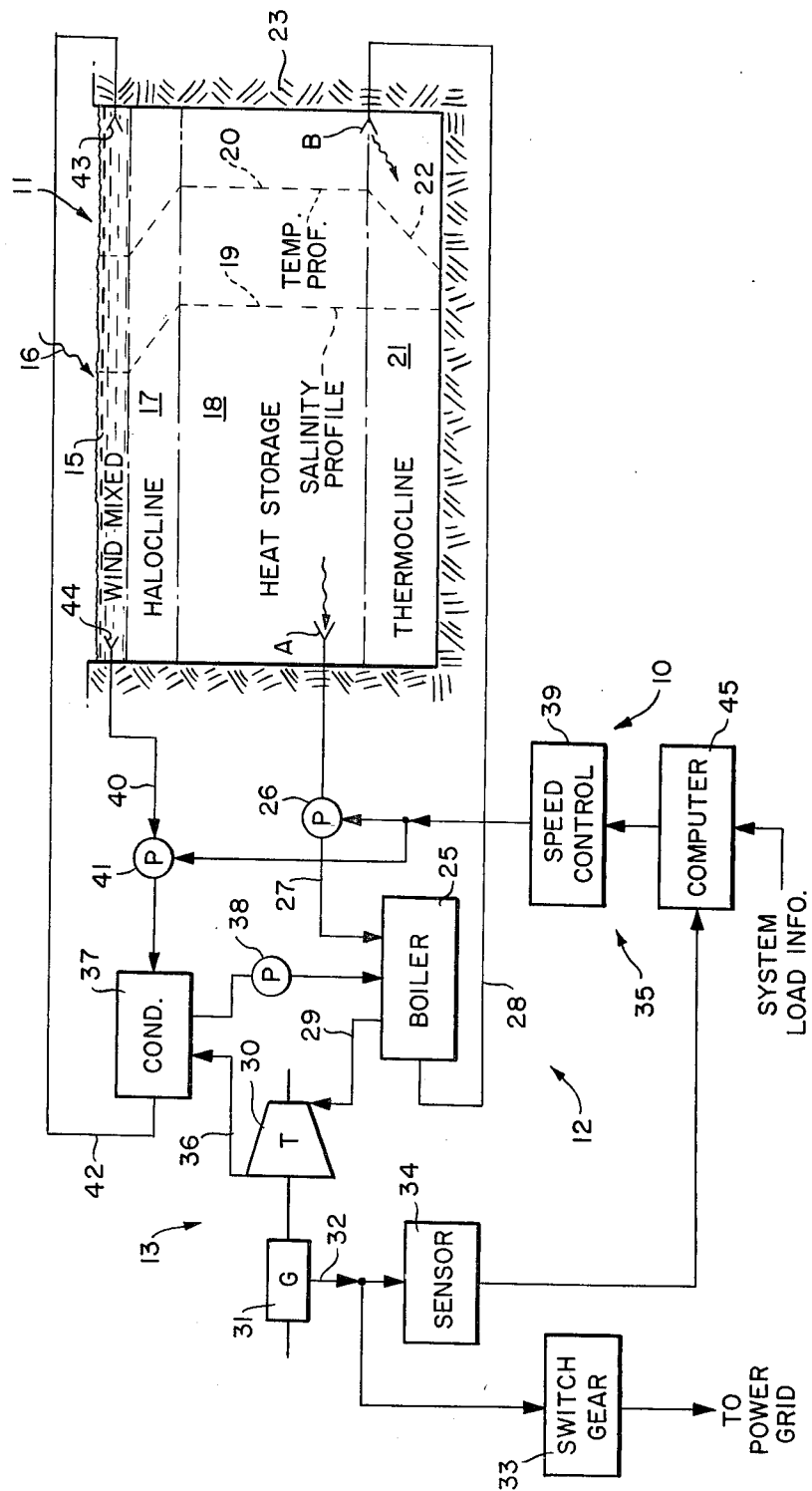
FIG. 1 is a block diagram of a solar pond power plant of the type described according to the present invention.

Referring now to FIG. 1, reference numeral 10 designates a solar pond power plant of the type described comprising solar pond 11, and powering plant 12 that utilizes low-temperature turbogenerator 13 for converting heat extracted from the pond into electricity. Pond 11 has a three-layer regime: an upper, convective, wind-mixed layer 15 of relatively low, uniform salinity (e.g., 3-5%) for receiving solar radiation 16, intermediate, non-convective halocline 17 having a downwardly directed salinity gradient with a maximum salinity at the bottom in the vicinity of 25-30% for absorbing solar radiation that penetrates the wind-mixed layer, and lower heat storage layer 18 of 25-30% uniform salinity for storing sensible heat by absorption of solar radiation penetrating to the heat storage layer.

Solar radiation 16 penetrating the wind-mixed layer and absorbed therein serves to locally heat the wind-mixed layer, establishing convection currents that transfer warmer, lighter water to the surface, where the warmer water is cooled by transfer of heat to the atmosphere. Radiation penetrating through the wind-mixed layer and absorbed in the halocline heats the halocline, but the inverse density gradient established by the salinity profile (designated by reference numeral 19) in the halocline prevents convection currents. Therefore, the temperature profile (designated by reference numeral 20) of the pond above the heat storage layer closely matches the salinity profile. After a period of time depending upon the latitude of the pond, a steady-state condition is reached at which the temperature in the heat storage layer may reach over 100° C. for a depth of several meters.

Thermocline 21 beneath the heat storage layer is of uniform salinity, but the temperature therein decreases uniformly with depth as indicated by reference numeral 22. Heat is also transferred between the water in the pond and ground 23 beneath and surrounding the pond. Thus, the ground has a complicated interaction with the heat storage layer in the seasonal dynamics of heat transfer to and from the pond.

In order to reduce the possibility of leakage of water from the solar pond into the ground, the bottom and sides of the solar pond may be covered with a liner of rubberized fabric capable of withstanding the temperatures to which the pond is heated. In addition, under some circumstances where the ground water level is close to the surface of the ground, the bottom of the pond may be insulated to reduce further the heat loss from the pond into the aquifer.

Power plant 12 includes boiler 25, which is a heat exchanger to which hot brine is supplied via internal coils (not shown) for vaporizing an organic working fluid, such as Freon or similar material, contained in the boiler. Hot brine is taken from the heat storage layer of the pond at point A through a suitable diffuser by pump 26; and, after the brine has passed through a filter (not shown), conduit 27 conveys the brine to the inlet side of the coils in boiler 25. After passing through the boiler and vaporizing the organic working fluid therein, the cooled brine exits the boiler through conduit 28 and is returned to the pond at point B through a suitable diffuser, and at a lower level, where the temperature of the cooled brine matches the temperature in the thermocline. The points A and B are sufficiently far apart so that the return flow of cooled brine does not adversely affect the brine flowing into the boiler.

Vaporized working fluid produced by boiler 25 is applied by conduit 29 to the inlet of turbine 30 of turbogenerator 13, where the vaporized working fluid expands, causing the turbine to drive generator 31, which produces electricity in leads 32. These leads are connected to switch gear 33, which controls the application of the output of turbogenerator 13 to a power grid that is part of a regional electrical generating system. Leads 32 are also connected to a power sensor 34 for detecting the level of power output by the turbogenerator and supplying information representing the level of power output to a control system indicated by reference numeral 35.

After being exhausted from turbine 13, the vaporized working fluid is transferred by conduit 36 to the inlet of condenser 37. Cooling water passes through the coils (not shown) of the condenser, causing the working fluid to condense into a liquid which is pumped by pump 38 back into boiler 25 for completing the working fluid cycle.

Cooling water for condenser 14 can be derived from a conventional source of water, such as a flowing river, or a fixed body of water associated with cooling towers; or, the wind-mixed layer of pond 11 can be utilized as a source of cooling water. The latter arrangement is shown in FIG. 1, wherein water from the wind-mixed layer is drawn through conduit 40 by pump 41 and delivered to the cooling coils (not shown) of condenser 37. The warmed cooling water exits the condenser through conduit 42 and is returned to the wind-mixed layer through suitable diffuser 43 located in the wind-mixed layer. Inlet diffuser 44 supplying water to pump 41 is located at a remote point as compared with diffuser 43 in order to minimize turbulence. With this arrangement, the heat rejected by the power plant is dissipated to the atmosphere.

Regardless of the area of the solar pond, the wind-mixed layer will have a depth of 10–50 cm, depending upon weather conditions. The depth of the wind-mixed layer should be as small as possible in order to minimize the amount of solar radiation absorbed in this layer. Accordingly, suitable windbreaks (not shown) can be floated on the surface of the water for this purpose.

The halocline, below the wind-mixed layer, has a depth of 1–1.5 m, and absorbs some of the solar radiation penetrating the wind-mixed layer. The remaining radiation penetrates to the heat storage layer below the halocline, thereby supplying heat to the heat storage layer. The depth of the heat storage layer will depend upon the heat capacity that is desired for the power plant. That is to say, if the pond is located at the same latitude as southern California, for example, the heat input from solar radiation to the heat storage layer is, on the average, about 40 watts/m², day and night, year-round. Assuming the water in the heat storage layer increases in temperature about 60° C. by reason of this heat input, the depth of the heat storage layer would increase, on the average, about 15 mm per day until, after one year, it would be about 5.5 m, assuming that no heat were utilized during this period. This is considered to be the steady-state condition of the pond.

If it is assumed that the efficiency with which heat in the heat storage layer is converted to externally available electrical energy by the turbogenerator is about 7.5%, then the electrical power represented by the heat storage layer is about 3 watts/m², which is to say that the electrical energy in the pond is about 0.072 KWh/m² day.

If heat were extracted from the heat storage layer at substantially the same rate at which heat is absorbed, on the average, and if the extracted heat were converted into electrical energy, taking into account the energy requirements of the plant itself, then $Q_e = 3$ watts/m². Thus, a pond of area 1 Km² (1,000 m × 1,000 m), in its steady-state condition, contains the equivalent of about $26 \times 10^6$ KWh of electrical power. This energy could be generated by utilizing a turbogenerator with a capacity of 3 MW that would operate continuously, day and night, throughout the year.

Such a mode of operation is not practical because it does not take into account servicing and maintenance that must be performed on both the pond and the mechanical and electrical equipment of the power plant. An "on-line" time of 70% of the hours in a year presently appears to be more practical; and with this service factor, the electrical energy available for base-load operation is, in effect, about 4.3 W/m². For a pond of area 1 Km², $Q_I = 4.3$ MW would be a first approximation of the installed generating capacity of the power plant. According to the present invention, however, $Q_I$ is made considerably larger in order to take advantage of the heat storage capacity of the pond in order to supply peak loads. For example, $Q_I = 20$ MW for a pond of area 1 Km² appears to be reasonable if the solar pond power plant is to be part of a regional generating grid. As described below, such a power plant could furnish 20 MW for about 3.5 hours per day throughout the year. Alternatively, by depleting the amount of heat stored in the pond (i.e., by reducing the depth of the heat storage layer), operation for periods of time greater than 3.5 hours per day is possible under emergency conditions. Similarly, peak operation for longer periods of time during high seasonal demand for power can be accommodated by reason of the heat storage capacity of the pond. For example, if summer demand requires, the solar pond power plant could be operated such that the available electrical energy is utilized during summer with regeneration of the heat storage layer taking place during the rest of the year. Finally, optimal use of the unique properties of a solar pond power plant may result in operation in such a way that the power output "follows the sun" (i.e., is larger during the time the solar input is larger). Operation at full power thus may be for as little as a few hours per day to as long as several consecutive days, or even weeks.

Figure 6:
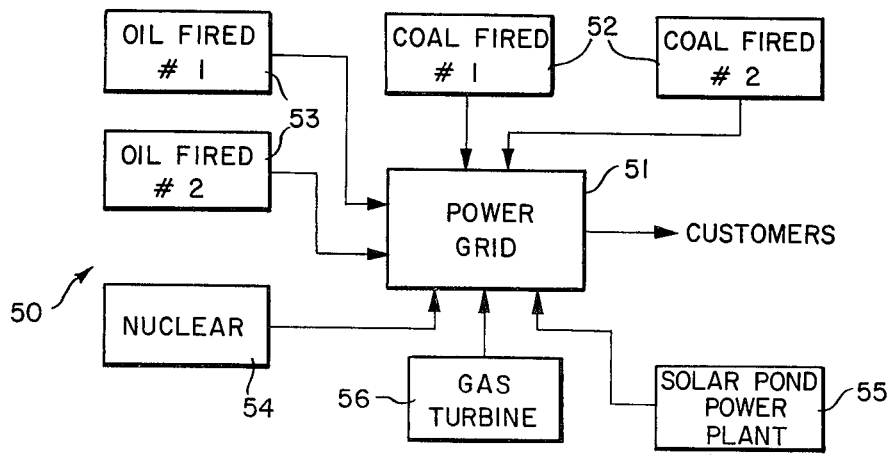
FIG. 6 is a block diagram showing an integrated electrical power generating system into which the present invention is incorporated.

Solar pond power plants can be integrated into a regional electrical power generation system of the type shown in FIG. 6 by reference numeral 50. Such a generating system would comprise a plurality of fossil-fueled power stations feeding into power grid 51 which supplies customers with electrical power on an as-needed basis. The system may include a plurality of coal-fired units 52, oil-fired units 53, nuclear units 54, as well as solar pond power plants 55. As is conventional, stand-by gas turbine plants 56 may be provided for peak power needs of the system. The time that each of the power plants is brought on line and the duration that the plant remains on line depends, in addition to the customer demand requirements, on the efficiencies of the various power plants to convert fuel into electricity. Typical relative efficiencies of the various types of conventional power plants are listed below:

| Type | Fuel | Sp. Fuel Con. (gm/KWh) | Fuel Cost ($/ton) | Fuel Component (¢/KWh) |
|---|---|---|---|---|
| Oil-Fired | Residual oil | 240 | 170 | 4.1 |
| Coal-Fired | Coal | 350 | 46 | 1.6 |
| Gas Turbine | Diesel | 360 | 330 | 11.9 |

Based on the above chart, it is clear that the most cost-effective way to generate electricity is to use coal-fired power plants, because the fuel component of the cost of generating electricity is the smallest. The next most efficient way to generate electricity is to utilize oil-fired power plants. The least efficient way to generate electricity is to use a gas turbine power plant, because the fuel component of the cost of generating electricity is the highest. There is a distinct advantage, however, in having gas turbine power plants available because they are easily and quickly brought on line and removed from service, and are ideally suited for covering the peak power requirements of a system.

Figure 5:
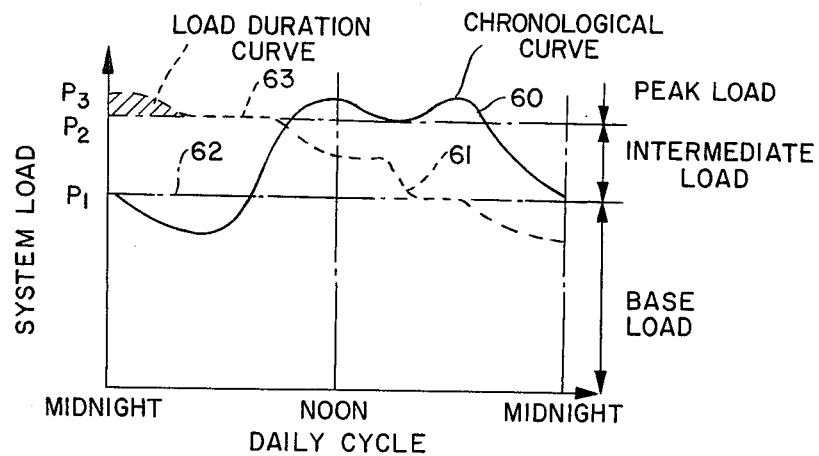
FIG. 5 shows a typical system load variation as a function of time during a single day.

Reference is made now to FIG. 5, which shows a typical system load as a function of time during a day. Curve 60 indicates that in the early hours of a day, the system load is relatively low, and then increases rapidly in the morning due to demands of industrial, commercial, and domestic customers. The load peaks around noon, and then decreases slightly in the afternoon, then increases again in the evening as lighting loads and domestic use increases. In the late hours before midnight, the load decreases.

Chronological curve 60 is converted to a load-duration curve 61 by plotting the ordinates at each hour of the day from the chronological curve. Load-duration curve 61 has three regions: base load $P_1$, indicated by level 62; intermediate load $P_2-P_1$, between levels 62 and 63; and peak load $P_3-P_2$, above level 63. Curve 61 shows that the base load power plants must operate at full capacity ($P_1$) for about eighteen hours per day, and then at reduced capacity for the balance of the day. The intermediate load power plant must operate at full capacity ($P_2-P_1$) for about eight hours and at reduced capacity for about eight hours per day. Finally, the peak power plant must operate at full capacity ($P_3-P_2$) for less than about three hours per day. The total peak-power energy is indicated by the cross-hatched portion of the curve shown in FIG. 5.

Based on the fuel costs described above, it is clear that the base load of the system should be supplied by coal-fired plants, which would operate at their rated load for most of the day and at a reduced load during the remainder of the time. Oil-fired plants could be used to supply the intermediate load. However, the peak load, which is of relatively short duration, is ideally handled by gas turbine power plants.

In a given regional electrical power generating system, the peak power requirement (i.e., the difference between level 64 and level 63 in FIG. 5, or $P_3-P_2$) is likely to be on the order of hundreds of megawatts, but for the present discussion it is assumed that the peak power requirements ($P_3-P_2$) is 20 MW for about 1,000 hours a year, which comes to approximately 2.7 hours per day. This peak power and the total energy required from a plant having this capability is ideal for a gas turbine power plant. In 1980 dollars, the cost of installation of a gas turbine power plant is approximately $300.00/KW. A specific fuel consumption for an up-to-date gas turbine power plant is approximately 360 gm/KWh, which, on the basis of operating for 1,000 hours per year, will require approximately 7,000 metric tons of diesel fuel. At a 1980 price of $330.00 per metric ton of diesel fuel, the fuel component cost of the electricity generated by a 20 MW gas turbine power plant operating 1,000 hours per year is approximately $0.12/KWh.

The initial cost of such a plant is approximately $6,000,000.00, on the cost of operating this plant per year based on the power output is approximately $800,000.00. This arrangement produces a cost of about $0.04/KWh for the overhead, maintenance, and amortization of the plant; so that the total cost of the 20,000,000 KWh of energy produced each year is approximately $0.16/KWh.

In the operation of regional electrical power generating systems, the fuel utilized and its cost becomes a dominant factor in planning future development and expansion. Where the fuel is oil, such as residual fuel oil or diesel fuel, the availability of the fuel as well as its price become important in deciding how to design the power generating system so that the costs remain as reasonable as possible. Thus, the conventional thinking of utilizing gas turbine power plants for peak power generating purposes must take into account the constant escalation in fuel prices. The problem is evident from the following chart:

| Fuel Component of Electricity (¢/KWh) | | |
|---|---|---|
| | Rate of Annual Rise in Fuel Cost | |
| Year | 4% | 5% |
| 1980 | 12¢ | 12¢ |
| 1985 | 14¢ | 15¢ |
| 1990 | 18¢ | 19¢ |
| 1995 | 22¢ | 25¢ |

From the above chart, with even the modest price escalations indicated, it is clear that within ten years the fuel component cost of generating electricity using a gas turbine will make this technique extremely expensive.

The present invention contemplates the use of a solar pond power plant to provide peak power requirements for a regional electrical power generating system based on providing a turbogenerator combination for the solar pond with an installed capacity of $Q_I$ which is from 2-10 times larger than $Q_e$, which, as has been defined above, is the net electrical energy that can be produced from a pond when heat is extracted from the heat storage layer at substantially the same rate at which heat is absorbed by the layer on the average. Again using the above illustration of providing peaking in a regional electrical generating system, a one-square-kilometer pond can produce, on a yearly basis, approximately 26,000,000 KWh of electricity. In view of the tremendous heat storage capacity of a solar pond, the 20,000,000 KWh required for peaking, in the example considered above, can be obtained from a solar pond by operating the plant at 20 MW for 1,000 hours a year (or approximately 2.7 hours per day). During the remaining 7,760 hours of the year, the plant could be operated at a reduced power output, or taken out of service for scheduled or emergency maintenance, so that the total energy generated for the year is 26,000,000 KWh; and the depth of the heat storage layer would be unchanged. In other words, during the balance of the year, the solar pond power plant would be operated to produce a total of 6,000,000 KWh.

Figure 2:
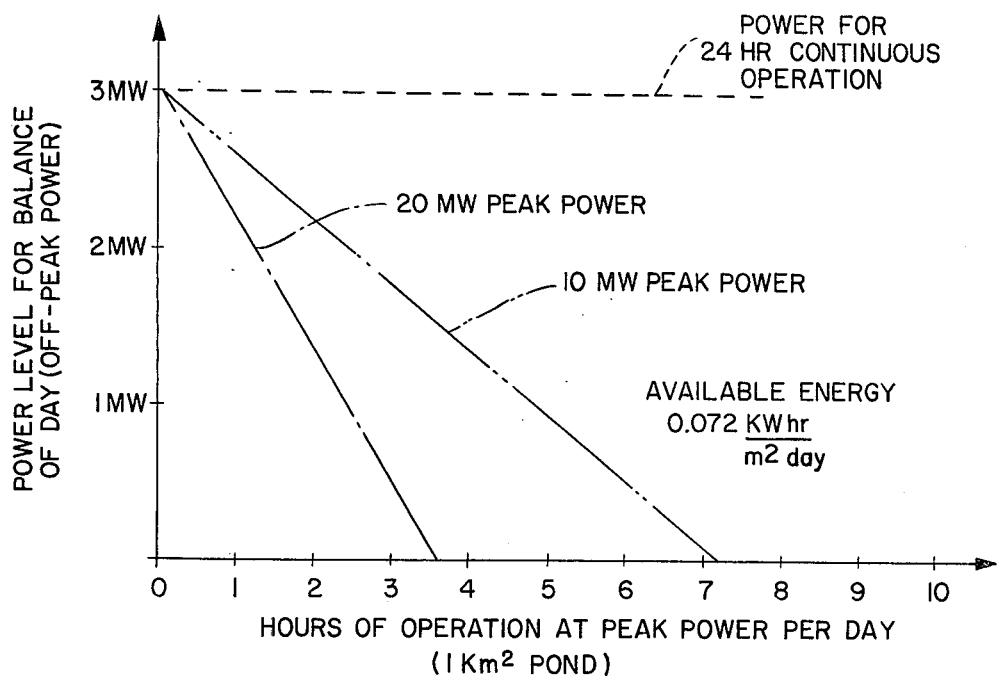
FIG. 2 is a graph that shows the hours of operation at peak power of the solar pond power plant, and the power level for the balance of the day for a one-square-kilometer pond.
Figure 3:
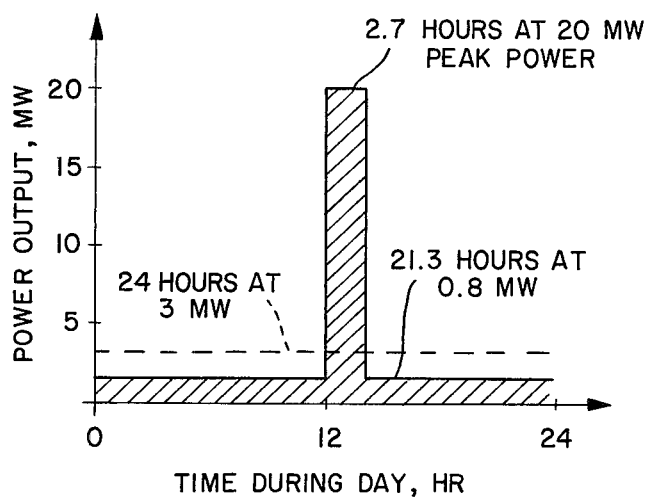
FIGS. 3 and 4 are time diagrams for illustrating power levels as a function of day for different periods of peak power output.
Figure 4:
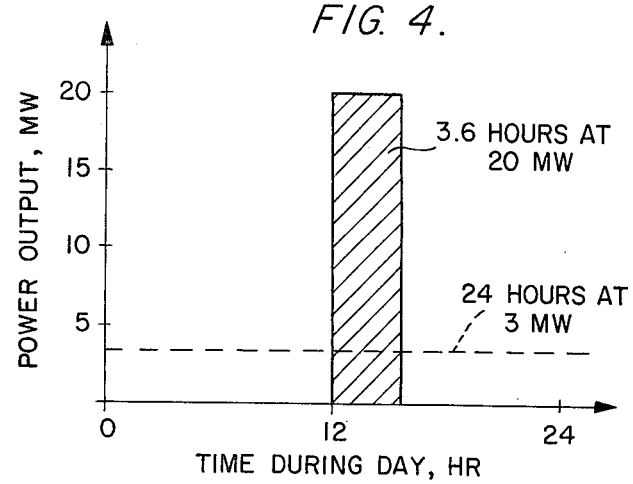

Reference is now made to FIG. 2, which shows the off-peak power output of the turbogenerator of a one-square-kilometer solar pond power plant as a function of the level of peak power operation. That is to say, the pond can be operated at a 3 MW level 24 hours a day throughout the year for generating 26,000,000 KWh of electricity. As shown in the curve, however, the pond can be operated at 20 MW for a period of about 3.6 hours per day throughout the year in order to generate the same total amount of electrical energy (see FIG. 4). Thus, if the solar pond power plant were operated as a peak-power source for about 2.7 hours per day, FIG. 2 shows that the plant could be operated at approximately 0.8 MW during the balance of the day (see FIG. 3) if a service factor of 100% is assumed. Inasmuch as a service factor of 70% appears to be more realistic, the plant could be operated at about 2.3 MW during the balance of operating time.

If it were assumed that the peak power requirements dictated by the load duration curve 63 shown in FIG. 5 is a 20 MW, and the duration of the load is approximately 2.7 hours per day, then a one-square-kilometer solar pond could furnish the required peak power of the generating system provided only that the turbogenerator located at the pond has a capacity of 20 MW. In other words, instead of building the turbogenerator with a capacity of 3 MW that matches the steady-state conditions of the pond, according to the present invention, the capacity of the turbogenerator would be approximately seven times the steady-state requirement. The relationship between the steady-state requirement and the peak-power requirements is dependent upon many factors, including the steady-state heat capacity of the pond, cost factors of the pond and the turbogenerating equipment, and the cost of constructing and maintaining the pond. However, in general, it is believed that the relationship between the steady-state power $Q_e$ and the rated capacity of the turbogenerator associated therewith should be in the range of 2–10.

To achieve the operation of the solar pond power plant as a peak power source for an electrical generating system, the solar pond power plant is provided with speed control 39, which is operated by computer 45 for the purpose of controlling the rate at which pump 26 furnishes brine to the boiler, as well as the rate at which pump 41 furnishes cooling water to condenser 37. Computer 45 is provided with information as to the current power requirements of the customers of the power generating system, as well as with the current power level of the turbogenerator 13 of the solar pond power plant. In this way, computer 45 determines when the output of the turbogenerator should be increased to 20 MW, and when the output should be reduced to a lower level. The change in power output of the turbogenerator is controlled by changing the capacity of pumps 26 and 41, as indicated above. By suitable programming, the computer keeps track of total power delivered by the plant to date and the power that can be delivered in the future.

In operation, switch gear 33 connects the output of the solar pond power plant to the electrical generating system, which supplies power to a variable system load. Computer 45 causes the solar pond power plant to be operated such that the output of turbogenerator 13 is at the rated capacity of the turbogenerator, which is several times greater than $Q_e$, when the system load exceeds a peak-power threshold as sensed by computer 45. On the other hand, when computer 45 senses that the system load is less than the peak-power threshold, speed control 39 is changed so that the solar pond power plant is operated such that the output of the turbogenerator is less than output $Q_e$.

Computer 45 is also capable of accumulating the total time during the day during which the turbogenerator operates at its capacity rating, so that in the event that the system load still exceeds the peak power threshold when the accumulated time of operation of the turbogenerator at its rated capacity exceeds the preselected period of time, in this case 2.7 hours per day, the computer is programmed to cause speed control 39 to reduce the capacity of pumps 21 and 41 to reduce the output of the turbogenerator. However, because of the heat storage capacity of the heat storage layer of the solar pond, the turbogenerator can be operated for longer than the preselected period of time at its rated capacity, but at the expense of decreasing the depth of the heat storage layer. In other words, the solar pond power plant could be operated continuously for periods of time longer than that indicated above if this is necessary, provided only that time is provided for the pond to regenerate itself and re-establish the steady-state depth of the heat storage layer. Thus, if an emergency situation were to arise, the pond could produce peak power for days or even weeks; and if the depth of the heat storage layer is not a factor, the total yearly energy produced by the pond could exceed 26,000,000 KWh. Regeneration of the heat storage layer can take place over a period of time when the turbogenerator and the other components of the power plant are being serviced.

Because of the long-term power requirements of the solar pond, halocline 17 will have to be maintained in order to insure that the salinity gradient is stable. Various techniques are now available for controlling the salinity profile of the halocline, such as selective mixing of the halocline as disclosed in copending application Ser. No. 149,564, filed May 14, 1980, now U.S. Pat. No. 4,336,999, or by constituting the solar pond as a standing, a rising, or a falling solar pond. If the pond were established as a standing pond, the salinity profile in the halocline is essentially linear. Copending U.S. Patent Application Ser. No. 134,568, filed Mar. 27, 1980, now abandoned, discloses techniques that could be utilized for stabilizing the halocline with time.

At the present time, it is estimated that a solar pond power plant producing 20 MW for 1,000 hours per year would cost approximately $30,000,000.00, based on pond construction costs of approximately $12.00/m$^2$ and power plant costs of approximately $900.00 per installed kilowatt. The operating costs, including amortization, would be approximately $3,200,000.00 per year. Based on producing 20,000,000 KWh at peak power, the cost of generating the electricity would be about $0.16/KWh, which is substantially the same as the cost for a 20 MW gas turbine power plant. However, as indicated above with regard to the escalating costs of fuel oil, it is clear that the future costs of operating a gas turbine power plant would greatly exceed the estimated cost of a solar pond power plant in a few years. Furthermore, the cost of pond construction can be expected to decrease significantly below the $12.00/m$^2$ envisioned, and the installed cost of the power plant should also decrease, making the solar pond power plant an even more attractive alternative to a gas turbine power plant.

As indicated previously, the present invention is not limited to a power plant in which an organic fluid turbine is used. Low-pressure steam turbines are also a possibility.

It is believed that the advantages and improved results furnished by the method and apparatus of the present invention are apparatus from the foregoing description of the preferred embodiment of the invention. Various changes and modifications may be made without departing from the spirit and scope of the invention as described in the claims that follow.

What is claimed is:

1. A method for using a solar pond power plant of the type having a solar pond with a heat storage layer for storing heat absorbed from solar radiation incident on the pond, a lower-temperature, Rankine-cycle turbogenerator operating on heat extracted from the heat storage layer, the method being to provide a turbogenerator combination with a generating capacity of $Q_I$ in excess of $Q_e$, where $Q_e$ is the net electrical energy that can be generated when heat is extracted from the heat storage layer at substantially the same average rate at which heat is absorbed by this layer.

2. A method according to claim 1 wherein $Q_I$ is in the range of two to ten times $Q_e$.

3. A method according to claim 2 wherein the turbogenerator includes a turbine that operates on an organic fluid.

4. A solar pond power plant for selectively supplying power to a variable system load comprising:
 (a) a solar pond with a heat storage layer for storing heat absorbed from solar radiation incident on the pond;
 (b) a boiler containing a working fluid;
 (c) a heat exchanger pump to pump water from the heat storage layer through the boiler for vaporizing the working fluid; and
 (d) a Rankine-cycle turbogenerator operated by vaporized working fluid from the boiler for generating electrical energy; and
 (e) the turbogenerator having a rated capacity $Q_I$ watts/m² of pond area, such capacity being greater than $Q_e$ watts/m² where $Q_e$ is the net electrical energy that can be generated when heat is extracted from the heat storage layer at substantially the same as the rate at which heat is absorbed by the heat storage layer.

5. A solar pond power plant according to claim 4 wherein $Q_I$ is in the range of two to ten times $Q_e$.

6. A solar pond power plant according to claim 5 wherein the working fluid is an organic fluid and the turbogenerator includes a turbine that operates on said organic fluid.

7. A solar pond power plant according to claim 4 wherein the rated capacity of the turbogenerator is from two to ten times greater than $Q_e$.

8. A method for using a solar pond power plant of the type having a solar pond with a heat storage layer for storing heat absorbed from solar radiation incident on the pond, a low-temperature, Rankine-cycle turbogenerator operating on heat extracted from the heat storage layer, the method being to provide a turbogenerator combination with a generating capacity of $Q_I$ in excess of $Q_e$, where $Q_e$ is the net electrical energy that can be generated when heat is extracted from the heat storage layer at substantially the same average rate at which heat is absorbed by this layer, and wherein the electrical output of the solar pond power plant is connected to an electrical generating system supplying power to a variable system load and the solar pond power plant is operated such that the output of the turbogenerator is more than $Q_e$ when the system load exceeds a peak-power threshold.

9. A method according to claim 8 wherein the solar pond power plant is operated such that the output of the turbogenerator is less than $Q_e$ when the system load is less than the peak power threshold.

10. A method according to claim 9 wherein the electrical output of the solar pond power plant is intermittently connected to the system in accordance with the level of system load.

11. A method according to claim 10 wherein the electrical output of the solar pond power plant is connected to the system only when the system load exceeds the peak-power threshold.

12. A method according to claim 8 wherein the total power generated by the solar pond power plant over a predetermined number of hours is substantially equal to the product of $Q_e$ by the number of hours.

13. A method according to claim 8 wherein the output of the turbogenerator is maintained at a level greater than $Q_e$ for a predetermined period of time while the system load exceeds the peak-power threshold.

14. A method according to claim 13 wherein the output of the turbogenerator is reduced to a level below $Q_e$ if the system load drops below the peak-power threshold within said predetermined period of time.

15. A method according to claim 14 wherein the output of the turbogenerator is less than $Q_e$ when the system load is less than the peak-power threshold.

16. A solar pond power plant for selectively supplying power to a variable system load comprising:
 (a) a solar pond with a heat storage layer for storing heat absorbed from solar radiation incident on the pond;
 (b) a boiler containing a working fluid;
 (c) a heat exchanger pump to pump water from the heat storage layer through the boiler for vaporizing the working fluid;
 (d) a Rankine-cycle turbogenerator operated by vaporized working fluid from the boiler for generating electrical energy;
 (e) the turbogenerator having a rated capacity $Q_I$ watts/m² of pond area, such capacity being greater than $Q_e$ watts/m² where $Q_e$ is the net electrical energy that can be generated when heat is extracted from the heat storage layer at substantially the same as the rate at which heat is absorbed by the heat storage layer; and
 (f) a control system for operating the pump such that the electrical output of the turbogenerator is $Q_I$ when the system load exceeds a peak-power threshold.

17. A solar pond power plant according to claim 16 wherein the control system operates the heat exchanger pump such that the turbogenerator operates at rated capacity when the system load exceeds the peak-power threshold.

18. A solar pond power plant according to claim 16 wherein the control system operates the heat exchanger pump such that the electrical output of the turbogenerator is less than $Q_I$ when the system load is less than the peak-power threshold.

19. A solar pond power plant according to claim 16 wherein the control system operates the heat exchanger pump such that the turbogenerator operates at rated capacity after the system load exceeds the peak-power threshold for a preselected period of time thereafter.

20. A solar pond power plant according to claim 19 wherein the control system operates the heat exchanger pump such that the output of the turbogenerator is less than $Q_I$ whenever the system load decreases below the peak-power threshold.

* * * * *